United States Patent [19]
Fukuzawa et al.

[11] Patent Number: 5,638,207
[45] Date of Patent: Jun. 10, 1997

[54] FLARE-PREVENTION OPTICAL SYSTEM, FLARE-PREVENTION METHOD, AND FLYING HEIGHT TESTER

[75] Inventors: Tadashi Fukuzawa, Tokyo-to; Teiji Hisano, Fujisawa; Yasuji Ozawa, Fujisawa; Yasuyuki Takahashi, Fujisawa; Hiroshi Watabe, Yokohama, all of Japan

[73] Assignee: International Business Machines Corporation, Armonk, N.Y.

[21] Appl. No.: 516,468

[22] Filed: Aug. 17, 1995

[30] Foreign Application Priority Data

Sep. 16, 1994 [JP] Japan .................................. 6-221323

[51] Int. Cl.$^6$ .............................. G02B 21/20; G02B 5/30; G11B 13/04; G01J 4/00
[52] U.S. Cl. ........................ 359/375; 359/483; 359/484; 369/13; 369/47; 356/365
[58] Field of Search ........................ 359/483, 484, 359/375; 369/13, 47; 356/365

[56] References Cited

U.S. PATENT DOCUMENTS

| | | | |
|---|---|---|---|
| 4,228,473 | 10/1980 | Himuro et al. | 360/114 |
| 4,309,110 | 1/1982 | Tumerman | 356/365 |
| 5,321,672 | 6/1994 | Miyamoto et al. | 369/13 |

*Primary Examiner*—Paul M. Dzierzynski
*Assistant Examiner*—Mohammad Y. Sikder
*Attorney, Agent, or Firm*—Noreen Krall; Andrew J. Dillon

[57] ABSTRACT

An optical system is provided in which flare is prevented and, when the light reflected from a reflection component is modulated by a photoelastic phenomenon, the effect of the modulation on the measurement of the intensity of the reflected light can be eliminated, and, further, a flying height tester for a magnetic head is provided using such optical system. A multilambda plate is provided in the flare-prevention optical system for allowing the light reaching a reflection component and the light reflected from the reflection component to pass, and for allowing the phase difference between the ordinary ray and the extraordinary ray to vary by $2\pi$ or more depending on the wavelength of light. Since the light passed through the multilambda plate only varies in the peak position and the peak height varies little even if the light has experienced modulation, no error occurs in the spectrum intensity of the light. A depolarizer may be substituted for the multilambda plate.

4 Claims, 12 Drawing Sheets

FLARE-PREVENTION OPTICAL SYSTEM, FLARE-PREVENTION METHOD, AND FLYING HEIGHT TESTER

BACKGROUND OF THE INVENTION

1. Technical Field

The present invention relates in general to an improved optical system using an optical interference method in the measurement of the flying height of a magnetic head for a magnetic disk and in particular to an optical system wherein, when the interfence light of a magnetic head and a glass disk, which is an alternate to the magnetic disk, undergoes modulation due to a locally uneven internal stress generated in the glass disk during the rapid rotation of the glass disk, the effect of the interference light can be eliminated to obtain a correct flying height.

2. Description of the Related Art

The flying height tester (FHT) which evaluates the flying height of a magnetic head for a magnetic disk storage system is an important apparatus which is essential to the development and manufacture of a magnetic head, and many testers have been developed up to the present. Among them, the FHT of the type which uses the interference of light to measure the flying height is widely used as a tester in production lines because it requires no electrical connection and is noncontacting.

This type of FHT uses a transparent quartz disk or glass disk in place of the magnetic disk and measures the interference color produced by the multiple interference effect of a microscopic gap (on the order of 100 nm between the disk and the magnetic head) to estimate the flying height. This method enables a highly precise measurement, in principle.

FIG. 1 shows a diagram of the FHT. As shown in this figure, light 28 from a light source 25 is reflected at a half-mirror 29 and introduced between the quartz disk 23 and the head 21, such that the reflected light from the disk 23 and the reflected light from the head 21 cause a multiple interference action with each other. This interference light 32 is spectrally divided into at least three wavelength regions and introduced to different light detection means 61, 62, and 63 for the respective wavelength regions. The intensity of the spectrally divided light provided to the respective wavelength regions for the respective detectors depends on the spacing between the disk and the head, or the flying height of the head. Thus, by previously obtaining the relationship between the flying height and the intensity of light for each spectrally divided light, the flying height of the head can be obtained. The principle of the FHT is disclosed in detail in Japanese Patent Application No. 4-297004 filed by this applicant.

FIG. 2 represents the intensity of the reflected light modulated by a multiple interference effect as a function of the wavelength of the light and the flying height. If all of the optical constants of the measuring system, that is, the refractive index and the optical quenching coefficient of the magnetic head surface, are previously obtained for all of the necessary wavelength regions and the spectral sensitivity characteristics of the light source, photodetector, and spectrometer are also known, then a reflection spectrum such as that shown in FIG. 2 is uniquely obtained from the theoretical formulas represented by the following first to fifth expressions.

$$g(\lambda, x) = \left| \frac{r_{12} + r_{23}e^{-2i\phi}}{1 + r_{12}r_{23}e^{-2i\phi}} \right|^2 \quad \text{[Numerical expression 1]}$$

$$\phi = \frac{2\pi x}{\lambda} n_2 \cos\theta_2 \quad \text{[Numerical expression 2]}$$

$$r_{12} = \frac{k_{1x} - k_{2x}}{k_{1x} + k_{2x}} \quad \text{[Numerical expression 3]}$$

$$r_{23} = \frac{k_{2x} - k_{3x}}{k_{2x} + k_{3x}} \quad \text{[Numerical expression 4]}$$

$$k_{jx} = \frac{\omega}{c} n_j \cos\theta_j \quad (j=1,2,3) \quad \text{[Numerical expression 5]}$$

In the expressions, $n_1$, $n_2$, and $n_3$ represent the complex index of refraction of the quartz (glass) disk, the air, and the magnetic head, respectively, $\lambda$ represents the wavelength of light, d represents the air gap length or the flying height, c represents the speed of light, and $\omega$ represents the angular frequency of the incident light. Further, $r_{12}$ represents the reflectivity at the interface between the disk and air, $r_{23}$ represents the reflectivity at the interface between air and the magnetic head, and $k_j$ represents the x-component of a wave number vector.

If such functions are prepared in advance, then, by comparing them with the interference colors of the magnetic head flying above the quartz disk the flying height which is not identified can be measured with good accuracy.

In this case, there are two possible methods for determining the flying height. That is, a method for measuring the reflection spectrum of the flying head in a certain wavelength region, seeking out the spectrum related to the same shape as the measured spectrum from the group of spectrums prepared in advance, and obtaining the flying height corresponding thereto, and a method for focusing on the light of several specified wavelengths, and reversely calculating the flying height from the combinations of the intensities of the respective reflected light. The former is called a spectrum evaluation method and the latter is called a three-wavelength method because the measurement is performed using three wavelengths.

The spectrum evaluation method is characterized in that it is easy to determine the flying height because the same spectrum shape is never provided to different flying heights if a proper wavelength range is selected. For this reason, almost all of the FHTs employ this method. However, to derive such a function, it is necessary to determine all of the optical constants of the measuring system, that is, the refractive index and optical quenching coefficients of the magnetic head surface, as well as the spectrum sensitivity characteristics of the light source, photodetector, and spectrometer prior to testing as described earlier. Such measurement requires expensive optical equipment and a high degree of expertise in performing optical measurement. Thus, spectrum evaluation is not appropriate as a calibration method for equipment which is installed in a production line for continuous evaluations.

Furthermore, the small flying height utilized in high-density magnetic disk devices renders the distinction between the spectrum shapes small, making the determination of the flying heights more difficult. In the range of a flying height from 50 nm to 100 nm, there is little change in the spectrum shape in the visible radiation region and only the offset component changes. Since the flying height is estimated from the spectrum shape in this method, it is difficult, in principle, to employ the spectrum evaluation method where the change in the spectrum shape is small.

In the three-wavelength method, the amount of data to be prepared in advance can be substantially smaller compared to the spectrum evaluation method. This method uses three monochromatic lights of different wavelengths, and can uniquely obtain the flying height from the combination of the reflected light intensities giving the same flying height. To have data for measuring the flying height up to 100 nm with a resolution of 1 nm in the spectrum evaluation method, it is necessary to prestore 100 functions, but for the three-wavelength method, it is only necessary to prestore three functions. Thus, in this method, the number of necessary optical constants can be small. However, it is troublesome for an operator to measure the optical constants each time the type of head changes. That is, when the material of the head changes, it is necessary to measure the optical constants using a standard sample with known gap length, but the manufacturing precision of the gap of the standard sample is difficult to maintain as the flying height becomes extremely small. A second problem with the three-wavelength method is that water condensation in the gap can result in an incorrect gap length measurement.

The present inventor proposed a completely new evaluation algorithm different from the conventional one to solve such problems, as disclosed in Japanese Patent Application No. 5-205308. In accordance with this method, a high precision measurement can be performed with a very simple apparatus because an ordinary television camera can be used as a spectrometer while using white light as the light source. That is, in that method, spectral division is performed by the filter of a TV camera, as shown in FIG. 3, and the intensity of the light for a single spectrally divided wavelength range is evaluated in the form of the integrated intensity of light. Then, by specifying the relationships between the combinations of the intensities of light beforehand for the respective spectrally divided wavelength regions and the flying height as shown in FIG. 4, and by comparing them with the measured integrated intensity for each wavelength region, the flying height is obtained.

With reference now to FIG. 5, only the optical system of the FHT is shown. The light generated by the light source 25 passes through the polarizer 503 via the lighting optical system 501. The unpolarized light which has emanated from the light source 25 is converted by the polarizer 503 to a light having only the polarized light for a specific direction, namely, a linearly polarized light. It is now assumed that the light is converted by the polarizer 503 to a light linearly polarized in the direction vertical to the page on which FIG. 5 is drawn. The linearly polarized light is reflected to the glass disk by the beam splitter 505, and passes through the objective lens system containing a zoom mechanism, and the quarter-lambda plate 570 to cause a phase difference of ¼ of a wave between polarized lights which are oscillating in directions vertical to each other, thereby to convert the linearly polarized light to a circularly polarized light or vice versa. Accordingly, the light linearly polarized when passing through the polarizer is circularly polarized when passing through the quarter-lambda plate, and reflected at the surfaces of the glass disk 23 and the head 21, respectively, to undergo a multiple interference action. These reflected lights are restored to a linearly polarized state when again passing through the quarter-lambda plate. However, the direction of the linear polarization at this time is obtained by rotating the direction of the first linear polarization by 90°. That is, according to the above assumption, the direction of the linearly polarized light which was originally vertical to the page surface is converted to a linearly polarized light having a polarization of a direction horizontal with respect to the page surface by passing through the quarter-lambda plate twice. Then, the light whose polarization direction was rotated by 90° again passes through the objective lens system and reaches the light detection means 515 through the analyzer 513. The polarizer 503 and the analyzer 513 are arranged so that their transmission polarization axes are orthogonal to each other.

The objective of rotating the polarization direction by 90° between the incident light and the detected light is to prevent flare. Flare refers to the light reflected from the inside of the objective lens system (light noise), which is mixed in with the multiple interference light of the reflected light from the glass disk and the head which is to be detected in order to measure the flying height. If the polarization direction is not rotated by 90°, then, because the directions of the reflected light (flare) and the multiple interference light are the same, the mixture of these passes through the analyzer to produce a large error. By arranging the polarizer, the quarter-lambda plate, and the analyzer in the above-described form, the polarization direction of the incident light can be rotated by 90° and the multiple interference light and flare can be discriminated from each other by the direction of the linear polarization axis. Further, by making the arrangement such that the transmission axis of the analyzer is coincident with the linear polarization direction of the multiple interference light, only the multiple interference light is allowed to pass, thus preventing the flare from passing.

In such a flare-prevention optical system, the most important element is the quarter-lambda plate for rotating the polarization direction by 90°. By placing the quarter-lambda plate so that its optical axis accurately forms a 45° angle with the polarization direction of the incident light, the polarization direction of incident light can be rotated by 90°. That is, in this optical system, light passes through the quarter-lambda plate twice, in the forward and backward directions, thus causing the same effect as that produced by light passing through a half-lambda plate once, which causes the polarization direction to rotate by 90°. As a consequence, if the angle between the optical axis of the quarter-lambda plate and the polarization direction of the incident light deviates from 45°, the polarization direction also deviates from 90°. As a result, the amount of light incident upon the light detection means decreases.

The optical system which prevents flare by rotating the polarization direction by 90° functions perfectly if no factor causing change in the polarization state exists in the optical path. However, the optical system does not function properly if the polarization state of the incident light changes for some reason after the first pass through the quarter-lambda plate and before the second pass. In this case, the incident light is not completely circularly polarized after passing through the quarter-lambda plate the first time and, hence, is not completely restored to a linearly polarized light when passed through the quarter-lambda plate. That is, since a polarization having a component deviating from the transmission polarization axis of the light detector occurs, a change is caused in the apparent intensity of the multiple interference light which should reflect the flying height and thus an accurate flying height cannot be obtained.

FIG. 6 is used to explain this. It is assumed that, for a certain wavelength region, solid line A represents the intensity distribution of a light passing through the analyzer and reaching the light detection means if no factor causing a change in the polarization exists in the optical path. If the polarization state changes, a polarization component deviating from the transmission axis of the light detector is produced, which results in the decrease of the light passing through the analyzer. As a result, the light reaching the light detection means has the intensity shown by broken line B. However, this phenomenon is caused by the change of the polarization state, not by a variation in the intensity of the multiple interference light itself; even if the flying height is the same (the intensity of the multiple interference light is constant), the apparent intensity of light would change. This phenomenon has a remarkably adverse effect on the accuracy of the flying height measurement.

In the FHT optical system, after the incident light passes through the quarter-lambda plate once, the light passes through the glass disk, and again passes through the quarter-lambda plate. The glass disk normally causes no change in the polarization state. However, when an internal stress is applied to the glass disk, birefringence is produced by a photoelastic effect to change the polarization state of the incident light. Such internal stress is produced by, for instance, the residual strain on glass or the unevenness of the tightening force.

Further, internal stress is also generated by centrifugal force due to rotation. In particular, under recent circumstances, where the rotational speed of the glass disk has become very fast, the photoelastic effect due to internal stress by centrifugal force and the change in the polarization state by the development of birefringence due to that effect can has a fatal effect on the accuracy of flying height measurement.

This phenomenon varies according to the relative relationship between the direction of the optical axis of birefringence and the polarization direction of the analyzer in the flare-prevention system. In addition, the change in the amount of reflected light due to the change in the polarization state becomes remarkable, particularly when the quarter-lambda plate is shifted from the position of 45° to perform the overall adjustment of the amount of light (diaphraming).

It is because the quarter-lambda plate is used that the change of the polarization state due to the development of birefringence by a photoelastic phenomenon affects the measurement accuracy. Since the quarter-lambda plate converts only the light having a complete circular polarization to complete linear polarization, it is very sensitive to the change in the polarization state and makes an extremely strong contribution to the change of the intensity of the light detected in the light detector. Thus, the idea of not using the quarter-lambda plate can also be introduced. The reason for this is that the quarter-lambda plate was originally placed to prevent flare, and there is no necessity for using the quarter-lambda plate if flare can be prevented.

One thought is, as shown in FIG. 7, to change the position of the beam splitter from the conventional position between the analyzer and the objective lens system to the position between the objective lens system and the glass disk. If this optical system is employed, no flare can occur since there is no reflection of illuminating light from the inside of the objective lens system. However, this arrangement has the problem that it is difficult to accurately align the optical axis for observing the multiple interference light.

Consequently, it would be desirable to provide an optical system in which the effect of the change in the polarization state involved in the development of birefringence by the photoelastic phenomenon of the glass disk can be reduced as much as possible, while preventing flare and maintaining the position of the beam splitter between the objective lens system and the analyzer as in the prior art. Further, if such an optical system is used, the measurement error can be kept to a minimum even if the glass disk rotates at a higher speed, whereby a high measuring accuracy can be maintained.

SUMMARY OF THE INVENTION

According to the present invention, three embodiments of a flare-prevention method and optical system are disclosed. The first embodiment is characterized in that, in a flare-prevention optical system having a light source, a polarizing component for allowing the light generated by the light source to pass and convert the light to a linearly polarized light of a first direction, an optical lens component for allowing the light having passed through the polarizing component to pass, and a light analyzing component for allowing the light reflected by at least one reflection component for reflecting the light having passed through the optical component to pass, the light analyzing component having a transmission axis orthogonal to the first direction, a depolarizer is provided between the optical lens component and the reflection component for allowing the light reaching the reflection component and the light reflected from the reflection component to pass. In this embodiment, as a natural light, the reflected light from the magnetic head and the reflected light from the glass disk are subjected to a multiple interference. Even if the light is modulated in the glass disk, the modulation is dissolved when the light further passes through the depolarizer.

Further, in the second embodiment, a multilambda plate is characterized in that the phase difference between the ordinary ray and the extraordinary ray continuously changes according to the wavelength. That is, this embodiment is characterized in that, a flare-prevention optical system having a light source, a polarizing component for allowing the light generated by the light source to pass and converting the light to a linearly polarized light of a first direction, an optical lens component for allowing the light having passed through the polarizing component to pass, and a light analyzing component for allowing the light reflected by at least one reflection component for reflecting the light having passed through the optical component to pass. The light analyzing component having a transmission axis orthogonal to the first direction, and wherein the multilambda plate is provided between the optical lens component and the reflection component for allowing the light reaching the reflection component and the light reflected from the reflection component to pass, and for allowing the phase difference between the ordinary ray and the extraordinary ray to vary by $2\pi$ or more depending on the wavelength of the light.

Such wavelengths appear periodically such that the phase difference between the ordinary ray and the extraordinary ray become $2m\pi\pm\pi/2$ (m:an integer) when light passes once through the multilambda plate having such characteristic. There are several tens of such special wavelengths, for instance, for a light of a continuous spectrum band, and a multi-peak sinusoidal spectrum is formed if the wavelengths are plotted on the abscissa and the overall transfer gain of the total optical system is plotted on the ordinate. Then, even if the polarization state is changed by the photoelastic phenomenon of the glass disk after the incident light passes through the multilambda plate once, the change in the polarization state is such that the peak positions of the spectrum on the several tens of sine waves merely shift to the left or right, and thus not have a significant effect on the integrated intensity of the light in each continuous spectrum band. Accordingly, the effect of the development of birefringence due to the photoelastic phenomenon can be suppressed to achieve a high-precision flying height measurement.

The last embodiment is a method of removing flare by separating the paths for the illumination light and the detected light. In view of the fact that flare is produced because the illumination light reflected by the objective lens system and the observation light exist on the same optical path and are mixed, the occurrence of flare can be prevented by this method.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
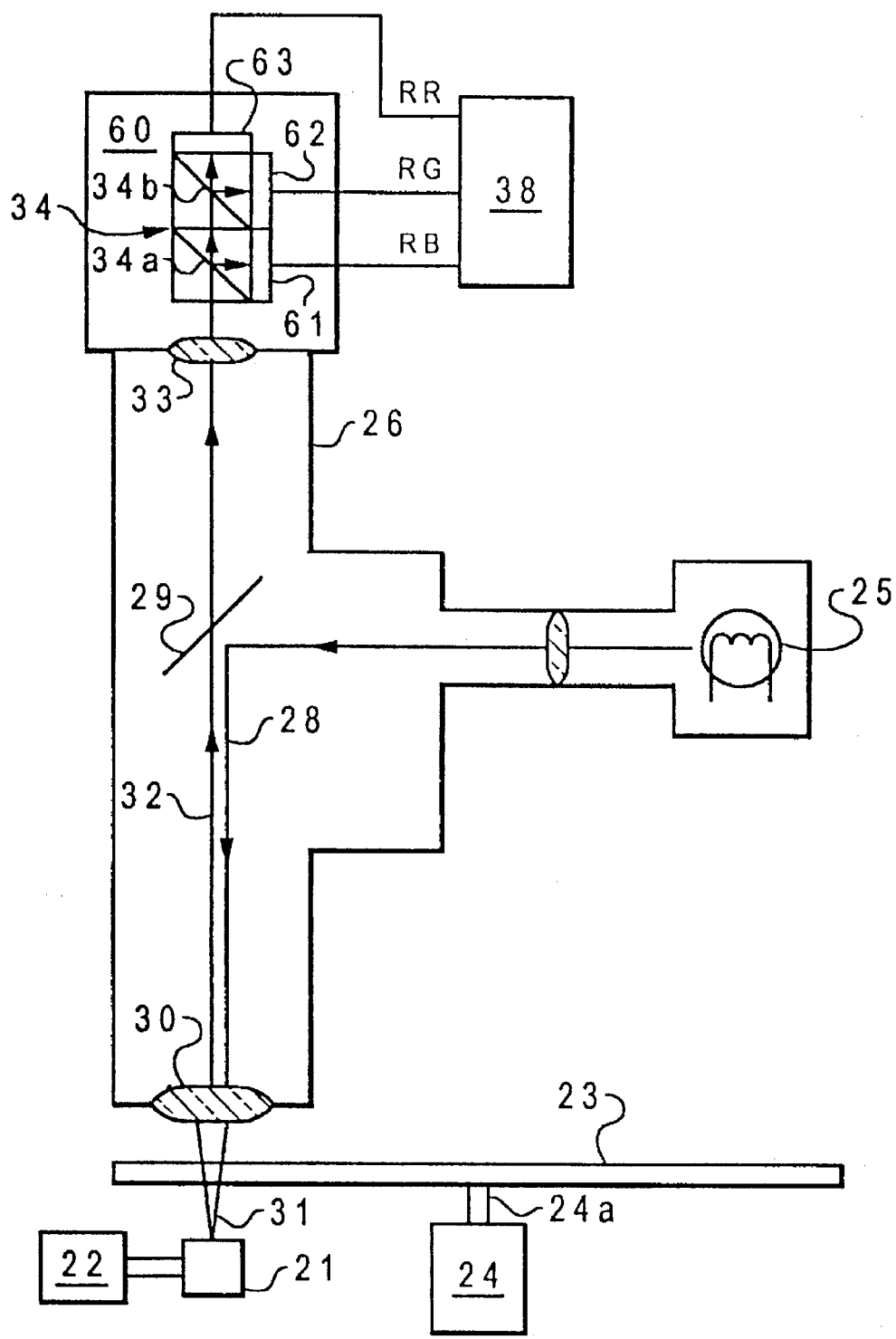
FIG. 1 is a diagram of a flying height tester for a magnetic head.
Figure 2:
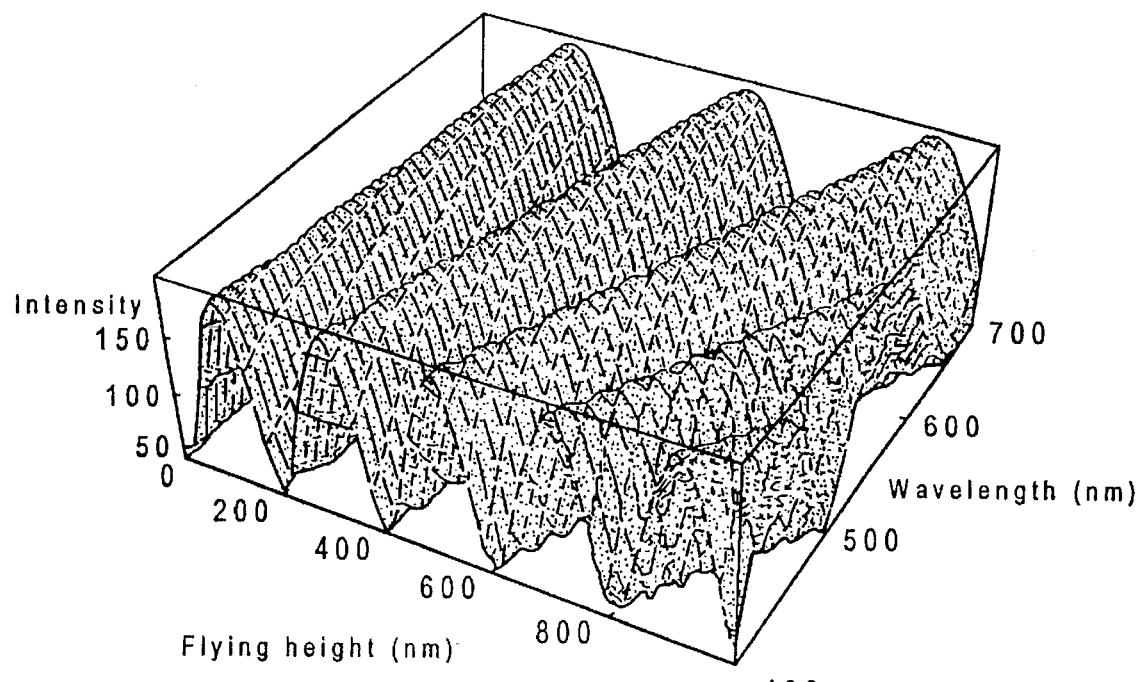
FIG. 2 is a diagrammatic view showing the relationship between the flying height and the intensity and wavelength.
Figure 3:
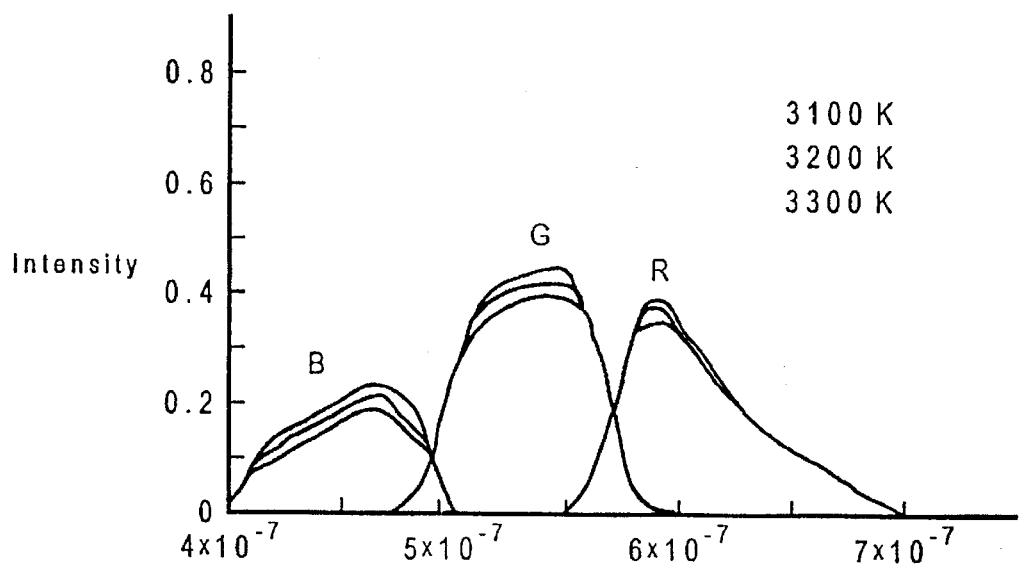
FIG. 3 is a graph showing the distribution of the light to be evaluated in the three-wavelength method.
Figure 4:
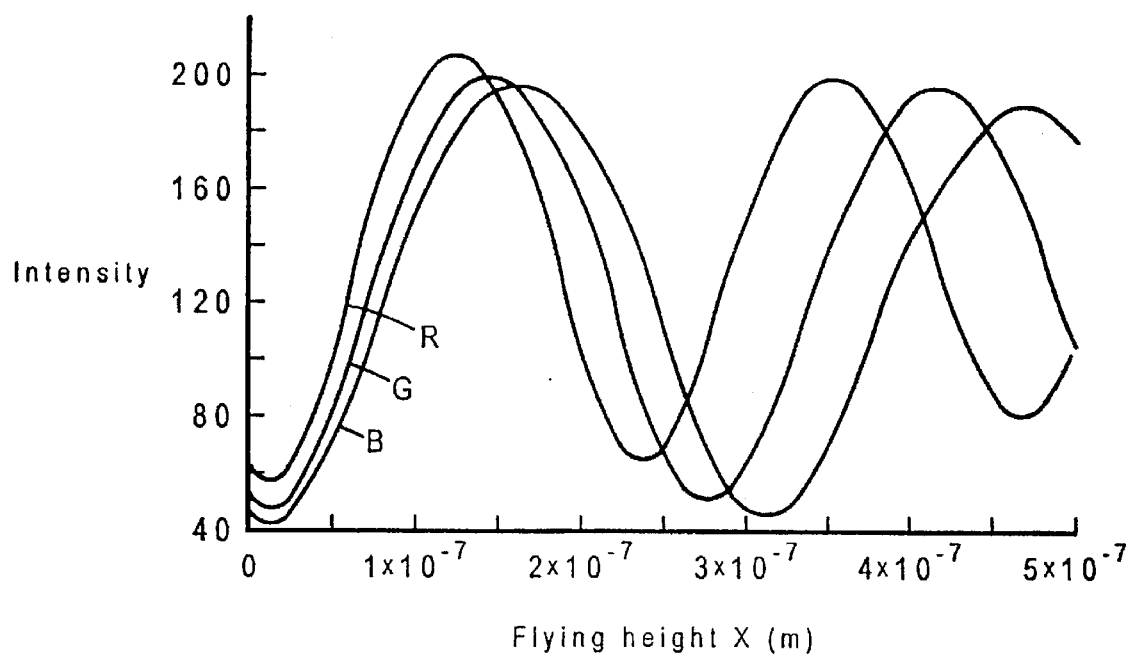
FIG. 4 is a graph showing the relationship between the integrated intensity and the flying height for each spectrum range.
Figure 6:
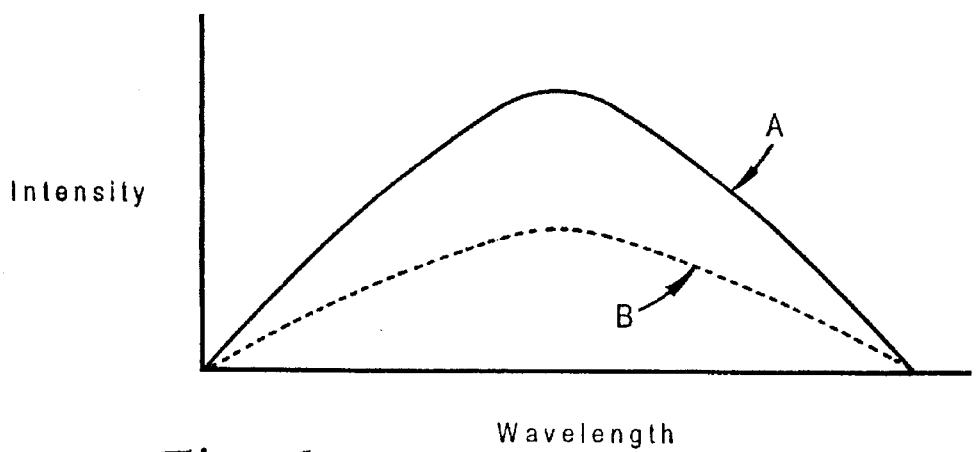
FIG. 6 is a diagram depicting the occurrence of an error when the incident light is modulated by a photoelastic phenomenon.
Figure 5:
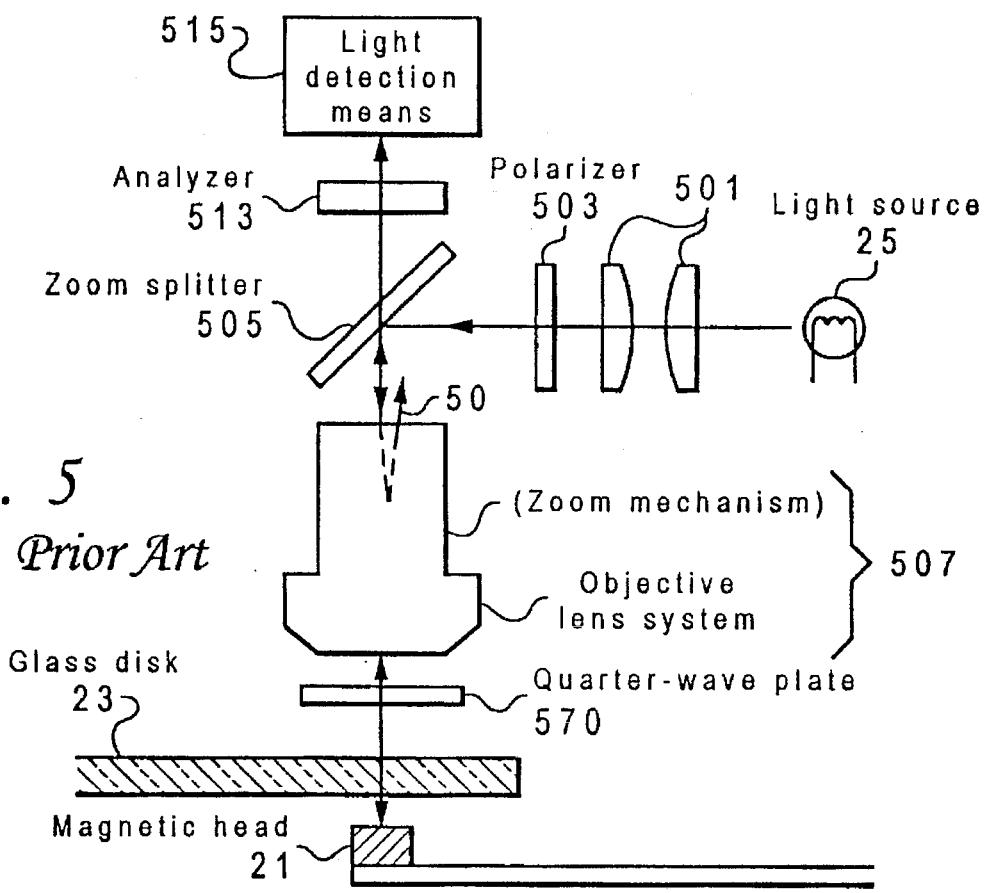
FIG. 5 is a diagram showing the application of a flare-prevention optical system to the flying height tester.
Figure 7:
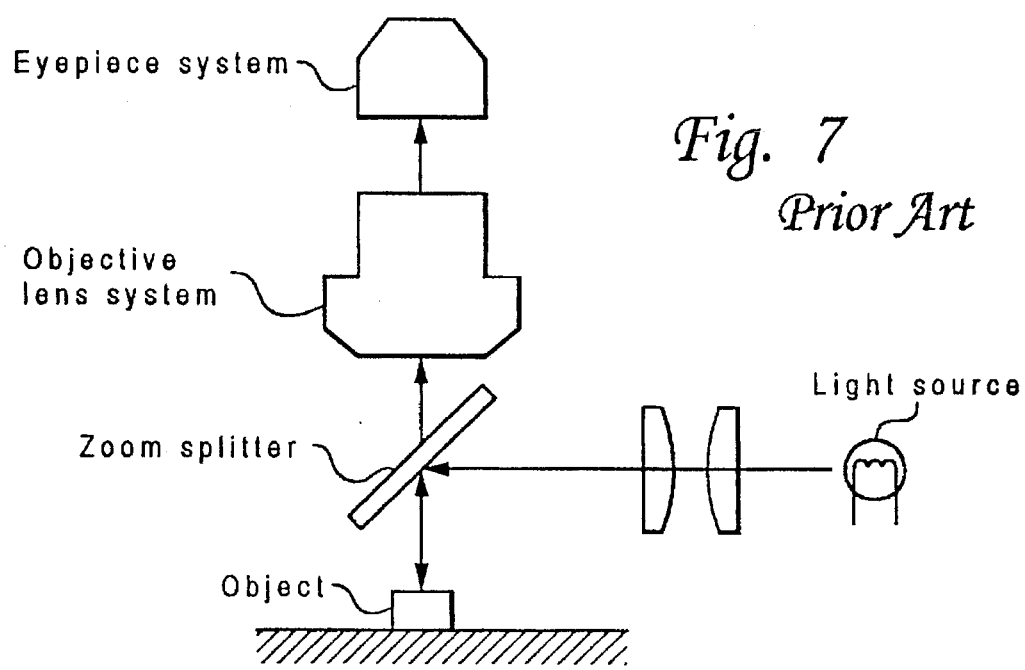
FIG. 7 is a diagram showing a conventional flare-prevention optical system.
Figure 21:
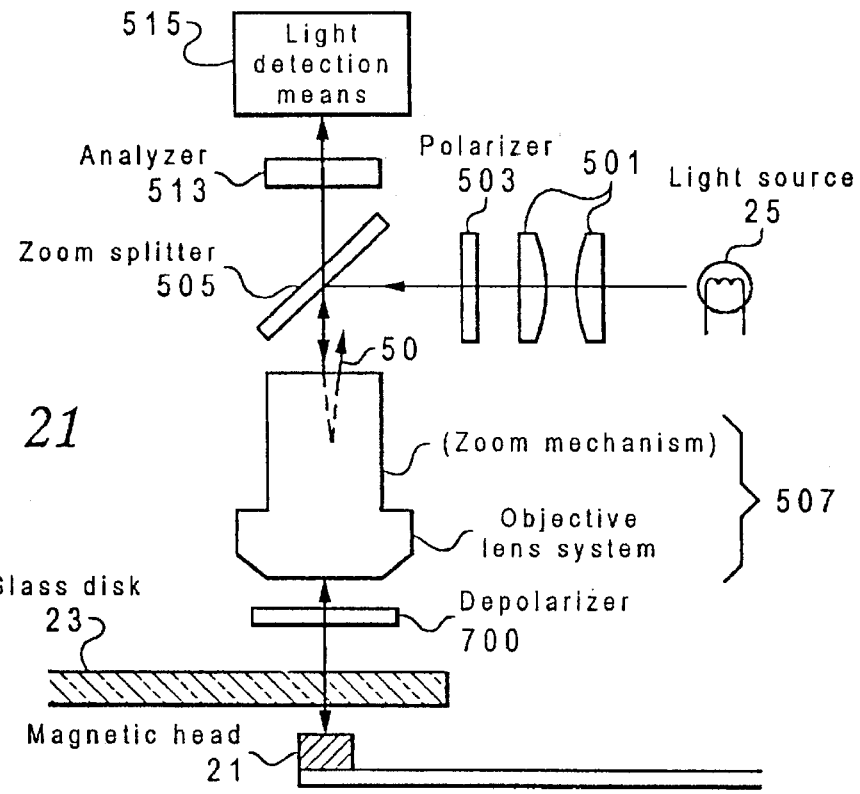
FIG. 21 illustrates a flare-prevention optical system in accordance with a first illustrative embodiment of the present invention.

In the following embodiments, description is made using an example in which white light is used as the light source. However, those skilled in the art may easily apply the invention of this application to monochromatic light. In a first embodiment of the present invention, which is illustrated in FIG. 21, a depolarization component converts completely and partially polarized lights in all states to a natural light with the same conversion efficiency. In this embodiment, the quarter-lambda plate 570 is removed from the system as shown in FIG. 5 and, instead, a depolarizer 700 is placed at that position. In this case, the illumination light converted to a linearly polarized light when passing through the polarizer 503 is restored to a nonpolarized state when passing through the depolarizer 700 substituted for the quarter-lambda plate 570.

In the prior art system, the light is reflected from the glass disk 23 and the head 21, and undergoes multiple interference depending on the flying height of the head 21. Simultaneously, the light is modulated by the photoelastic phenomenon due to the high-speed rotation of the glass disk 23, and thus, if it is directly used for measuring the flying height, a certain error is generated. In the first embodiment of the present invention, however, the modulated light again passes through the depolarizer 700, whereby the modulation is also eliminated. Then, part of the light restored to a state similar to natural light reaches the light detection means 515 through the analyzer 513. In this embodiment, the case that almost not the case that almost all of the illumination light passes through the analyzer as in the embodiment using the quarter-lambda plate, so that the absolute value of the detected light decreases. However, the decrease in the absolute value can be accepted by an adjustment. On the other hand, flare light 50 reaches the analyzer 513 while it is maintained in a linearly polarized state. Accordingly, the analyzer 513 is placed so that its transmission axis is orthogonal to the polarization direction of the flare light 50.

Figure 8:
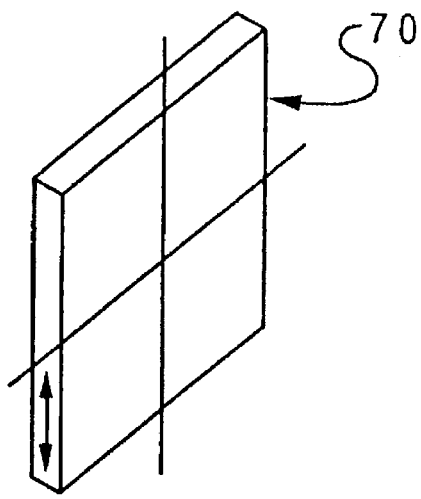
FIG. 8 is a diagram depicting a Lyot depolarizer.

The depolarizer 700 must be that for processing white light. Typically, as shown in FIG. 8, it is a plate 70 made of crystal (the crystal faces of which are oriented in a certain direction) glass, and the like. Plate 70 is a parallel-plane plate having a thickness of about 2 mm, which is cut in parallel with the optical axis and ground. It is well known to those skilled in the art as the Lyot depolarizer.

Figure 9:
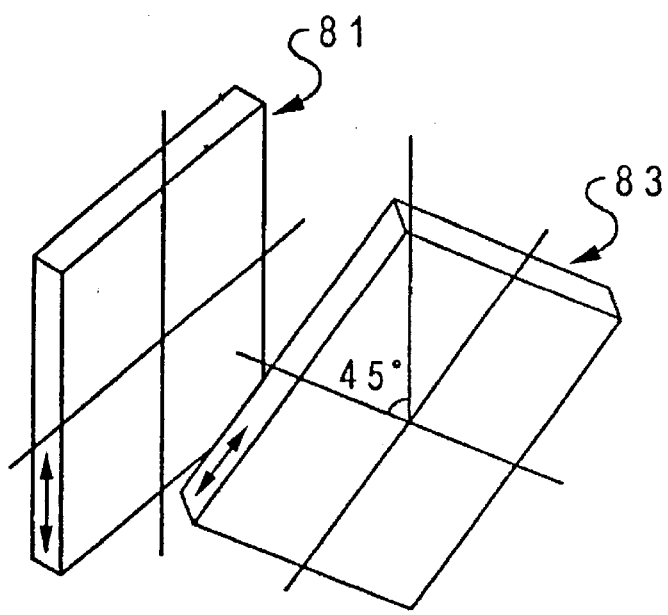
FIG. 9 is a diagram illustrating a Lyot depolarizer.

A depolarizer 700 consisting of a single plate as shown in FIG. 8 may not completely convert a linearly polarized light having a specific oscillation plane to a natural light. Thus, if this has a considerable effect on the measuring accuracy, two crystalline plates are placed so that their neutral axes form an angle of 45°, as shown in FIG. 9. In accordance with the preferred embodiment, for instance, the first plate 81 and the second plate 83 are cut to thicknesses of 1 mm and 2 mm.

respectively. The details of such a depolarizer are shown, for instance, in Tsuruta Masao, "Selected Books on Applied Physical Optics, Applied Optics 2," Baifukan, pp. 212–216.

Figure 10:
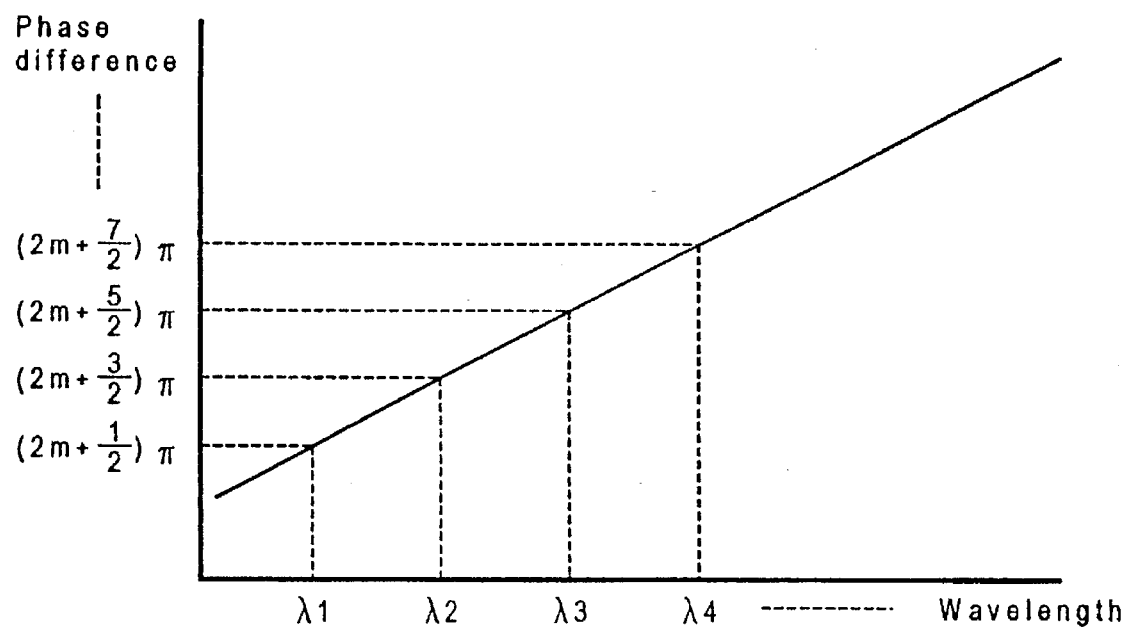
FIG. 10 is a graph showing the characteristics of the multilambda plate in which the phase difference between the ordinary ray and the extraordinary ray depends on the wavelength.
Figure 22:
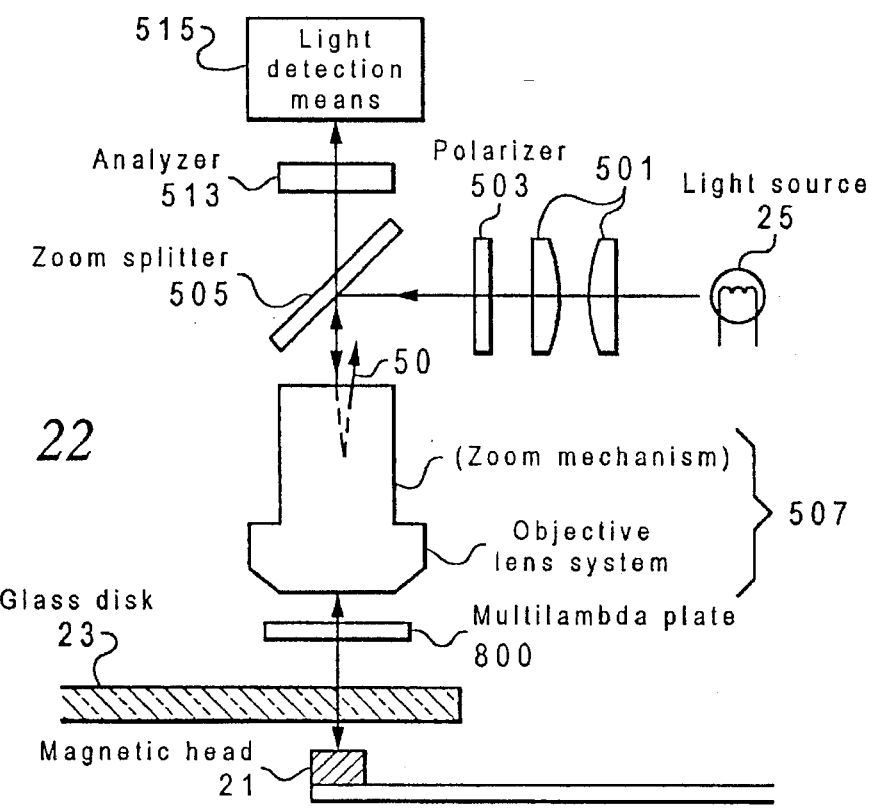
FIG. 22 depicts a flare-prevention optical system in accordance with a second illustrative embodiment of the present invention.

With reference now to FIG 22, a second preferred embodiment using a multilambda plate is now described. The multilambda plate 800 is such that the phase difference between the ordinary ray and the extraordinary ray varies with a certain relationship depending on the wavelength. For instance, as shown in FIG. 10, the relationship is typically linear. The phase difference of the light having passed through such a multilambda plate periodically becomes $2m\pi \pm \pi/2$ at wavelengths $\lambda 1, \lambda 2, \lambda 3, \lambda 4, \ldots$. That is, the polarization direction rotates by 90° as if the light had passed the quarter-lambda plate at periodical wavelengths, and the amount of the light passing through the analyzer becomes maximized. At wavelengths around that peak, the amount of light passing through the analyzer varies in a sinusoidal shape.

Figure 11:
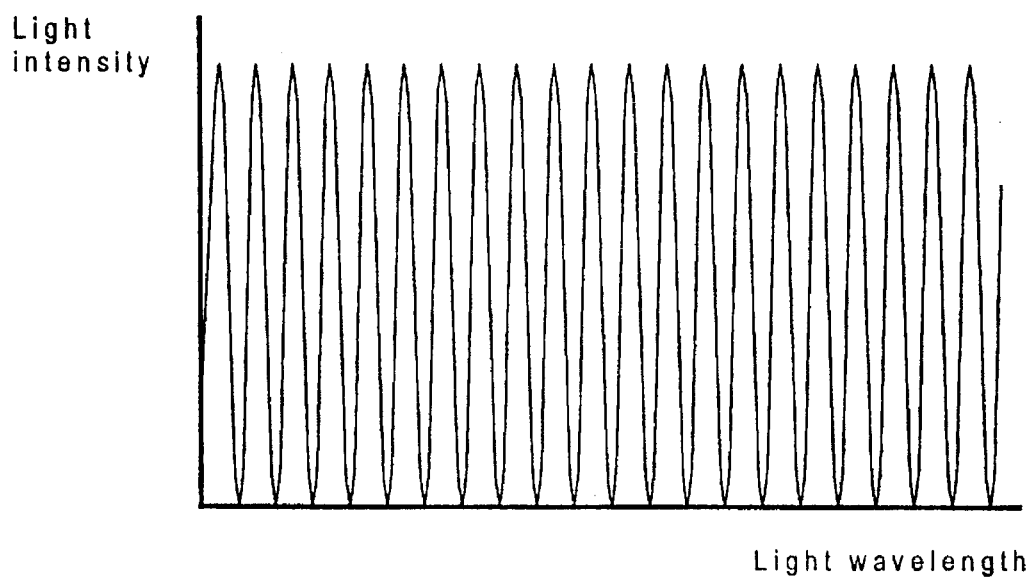
FIG. 11 is a diagram illustrating the relationship between the wavelength and intensity of light passed through the multilambda plate after being passed through the analyzer.

The relationship between the intensity and the wavelength of the light passing through the analyzer 513 is shown in FIG. 11. As shown in this figure, the light having passed through the multilambda plate 800 changes as if it had passed through a filter which exhibits a comb-shaped spectrum.

Figure 12:
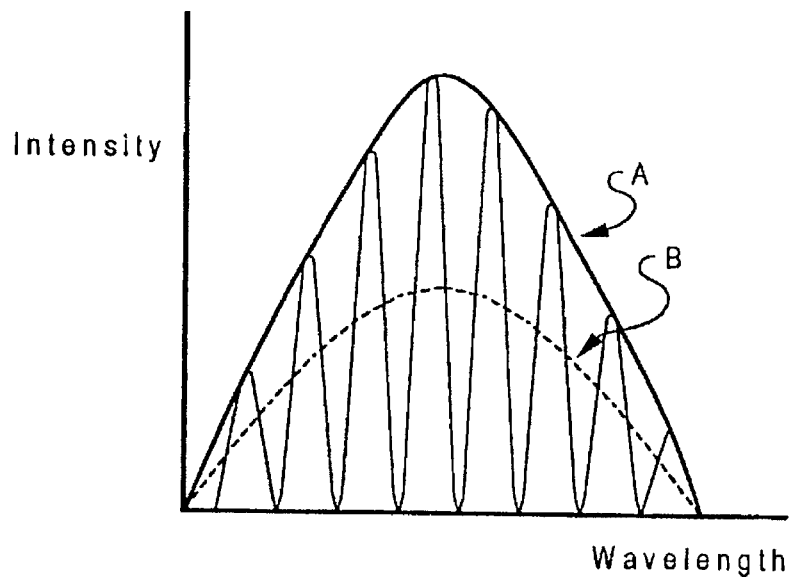
FIG. 12 is a diagram showing that the effect of the photoelastic phenomenon can be removed if the light passes through the multilambda plate.

FIG. 12 shows a certain spectrum of the FHT observed after the light passed through the multilambda plate 800. The light having passed through the quarter-lambda plate has, on the one hand, a spectrum as shown by solid line A, and the flying height is calculated using the spectrally integrated intensity of the light. If the polarization state is changed by the interposing glass disk, the intensity decreases from the original intensity of the light over a wide spectrum range, as shown by broken line B, and the integrated intensity changes so that a correct flying height cannot be obtained.

On the other hand, for the multilambda plate as shown in FIG. 12, the original polarization state is largely changed periodically by the change in the wavelength. The change of the polarization state due to the glass disk is added to the above change due to the wavelength, but its action is of a nature that can be canceled by slightly changing the wavelength. That is, even if the modulation of the light is caused by the photoelastic phenomenon occurring in the glass disk, the modulation only has the effect of shifting the wavelength, moving the peak points to the left or right as shown in FIG. 12, and it causes no substantial change of the period and the height of the peaks. Consequently, the effect of the photoelastic phenomenon can be removed if the flying height is evaluated using the detected light passed through the multilambda plate.

The multilambda plate 800 is made by processing a transparent birefringent material into a plate. This is the same as the quarter-lambda plate in physical principle, but it is different from the quarter-lambda plate in that the phase difference in the quarter-lambda plates is substantially quarter-lambda over a wide spectrum region, whereas the phase difference in the multilambda plate regularly changes in accordance with the wavelength and its absolute value is 50 to 100 times greater than the quarter-lambda plate.

The multilambda plate 800 can be formed crystal, mica, calcite, and the like. Among these, calcite is the most satisfactory in terms of the birefringence. Crystal is also excellent, particularly in its stability, accuracy, and transparency. Mica can be used to obtain a plate having a large surface area. Because there are advantages and disadvantages to using each material eventually, the material which is eventually used should be selected appropriately according to the purpose of use.

The thickness of the multilambda plate 800 differs according to the magnitude of the birefringence. If crystal is used, the thickness is selected to be for instance, approximately 1 to 2 mm. Since calcite has strong birefringence, a thickness of about 1/15 or more of that of crystal is sufficient. In addition to birefringence, transparency is also an important factors upon which the thickness depends. Since calcite is rather poor in terms of transparency, for instance, it cannot be made so thick. In a preferred embodiment for calcite, it has a thickness of, for instance, 0.1 to 0.2 mm, and it is sandwiched between glass for protection.

Figure 13:
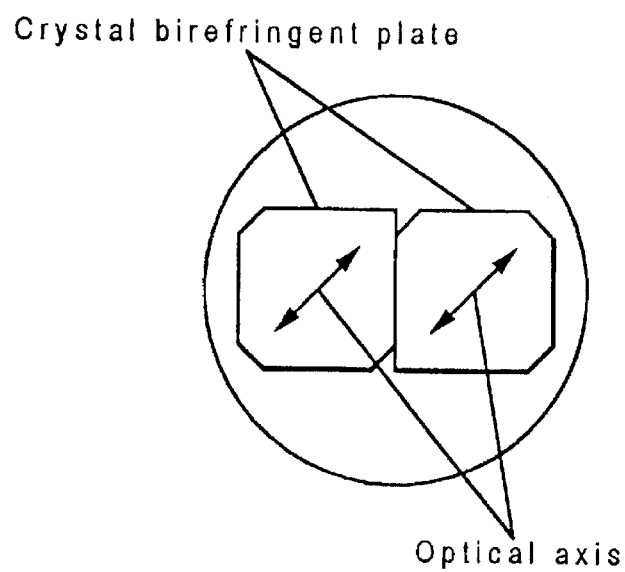
FIG. 13 is a diagram an exemplary installation of the multilambda plate.

A diagram of a multilambda plate 800 formed from crystal is shown in FIG. 13. This multilambda plate is made by placing two crystal plates which are 2 mm thick and about 20 mm square on the same plane, and fixing them to a metal holder. The optical axis of the crystal plates is inclined by 45° with respect to the principal axis as shown in the figure. The reason why two crystal plates are used is that a large area crystal plate is expensive.

In the second embodiment, a multilambda plate 800 as hereinabove described is substituted for the quarter-lambda plate in the system of FIG. 5. In an experiment, the degradation of the measurement accuracy due to the variation in the polarization state is completely eliminated. The details of this are described below using FIGS. 15 to 19.

Figure 15:
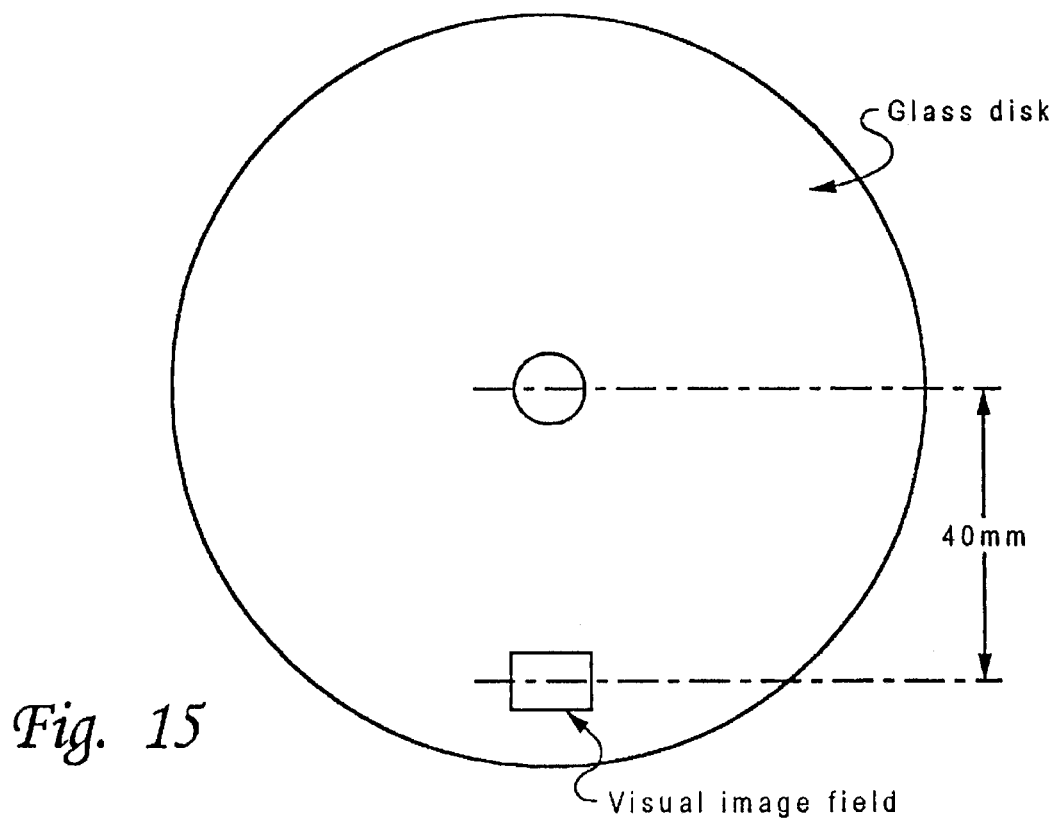
FIG. 15 is a figure showing the positional relationship between the observation window and the glass disk in the flying height test.

FIG. 15 shows the relationship between the visual image field of the optical system and the glass disk in the experiment. The glass disk is made of quartz and has an outside diameter of 90 mm and a thickness of 6 min. The sight of the optical system is set to a position spaced apart from the center about 40 mm in the radial direction. FIGS. 16 to 19 show RGB three color intensity data of reflected light from the bottom surface of the glass disk captured by a color CCD television camera and plotted along the horizontal line at the center of the window.

Figure 16:
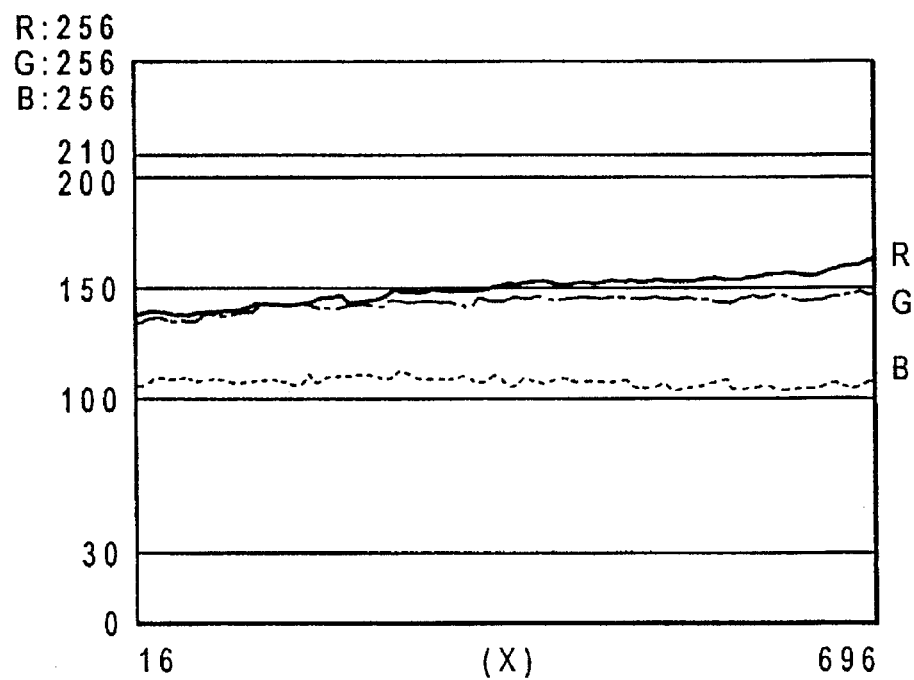
FIG. 16 is a graph showing the intensity of light at the center of the window when the disk is not rotated in the prior art optical system.
Figure 17:
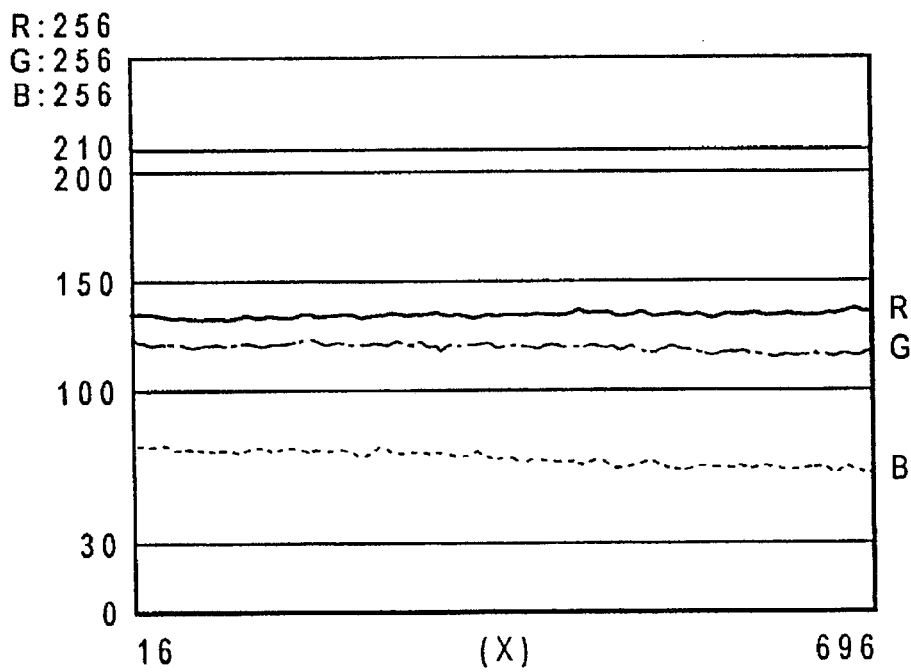
FIG. 17 is a graph showing the intensity of light at the center of the window when the disk is rotated at 10,000 rpm in the prior art optical system.

FIGS. 16 and 17 shows the data obtained with the construction of the conventional optical system using the quarter-lambda plate when the plate is not rotated, and when the plate is rotated at 10,000 rpm, respectively. Ideally, the same result should be obtained because the amount of reflected light is not varied by the number of revolutions. If the conventional optical system is used, however, it becomes obvious that the intensity totally decreases in the data for high-speed rotation (FIG. 17) as compared to the data for no rotation (FIG. 16). To be more precise, the amount of variation at the central position is R=−17% and G=−16%, and even −36% for B having a short wavelength. This indicates that an error is added into the measurement result because the light is modulated at high-speed rotation. Further, the change of the intensity, also depends on the position in the window. Thus, a complex numerical calculation would be required to compensate for this effect. From such a result, it is obvious that the construction of the conventional quarter-lambda plate can no longer be utilized in high-speed rotation.

Figure 18:
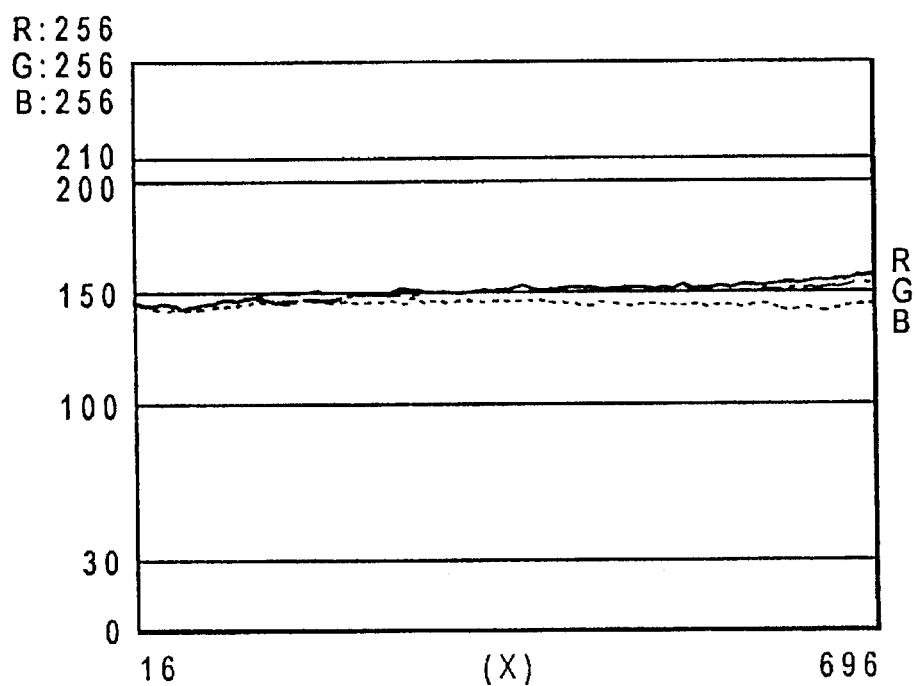
FIG. 18 is a graph showing the intensity of light at the center of the window when the disk is not rotated in the optical system of the second embodiment.
Figure 19:
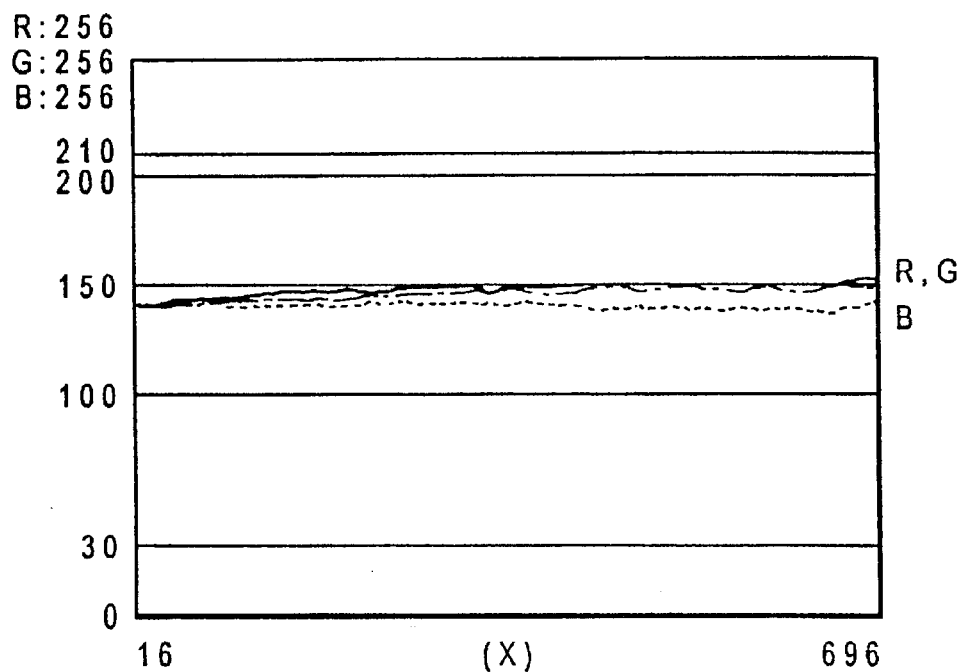
FIG. 19 is a graph showing the intensity of light at the center of the window when the disk is rotated at 10,000 rpm in the optical system of the second embodiment.
Figure 20:
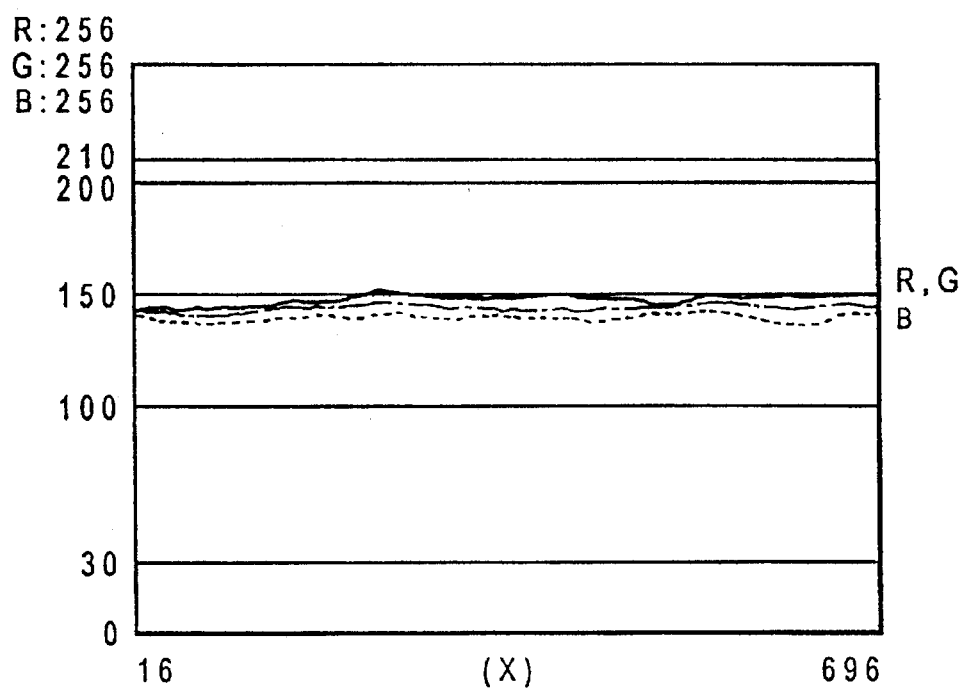
FIG. 20 is a graph showing the intensity of light at the center of the window when the disk is rotated at 10,000 rpm in the optical system of the third embodiment.

FIGS. 18 and 19 show the data obtained with the optical system of the present embodiment using the multilambda plate when the plate is not rotated and when it is rotated at 10,000 rpm, respectively. In comparing of the two figures, no significant change greater than the measurement error is observed. Accordingly, it can be seen that the error due to photoelasticity can be almost completely eliminated through the use of the multilambda plate. In addition, FIG. 20 shows the data obtained by utilizing the Lyot depolarizer instead of the quarter-lambda plate, with the remaining conditions being the same as FIG. 19. It can be understood that the effect of the photoelastic phenomenon can also effectively be eliminated by using the Lyot depolarizer, as in the case in which the multilambda plate is used.

Furthermore, for a material such as glass or plastic which originally has no birefringence, by intentionally adding stress, birefringence can be developed using the photoelastic phenomenon. In particular, since plastic has flexibility, the multilambda plate can be made at a very low cost by using this method. The stress distribution for this is given by applying different stresses depending on orthogonal directions. For instance, stresses are applied in a manner such that a compressive force is applied in the x-direction of a square or rectangular plastic material and a pulling force is simultaneously applied in the y-direction. Or, the photoelastic phenomenon can be produced without applying any stress in the y-direction.

To increase the internal stress and develop a large birefringence, plastic can be adhered to glass while applying anisotropic stresses, to the plastic as described above; and it can thereby be fixed. In addition, such a plurality of such structures can be laminated together to obtain an element having a large birefringence.

Moreover, birefringence can also be produced by forming a hyperfine diffraction grating in a material such as glass or plastic. The hyperfine diffraction grating is a diffraction grating which has a period equal to or smaller than one half of the wavelength. The development of birefringence by using such a hyperfine diffraction grating is disclosed in Aoyama et at., "Optics," Vol. 21, No. 5 (1992), pp. 269.

Figure 14:
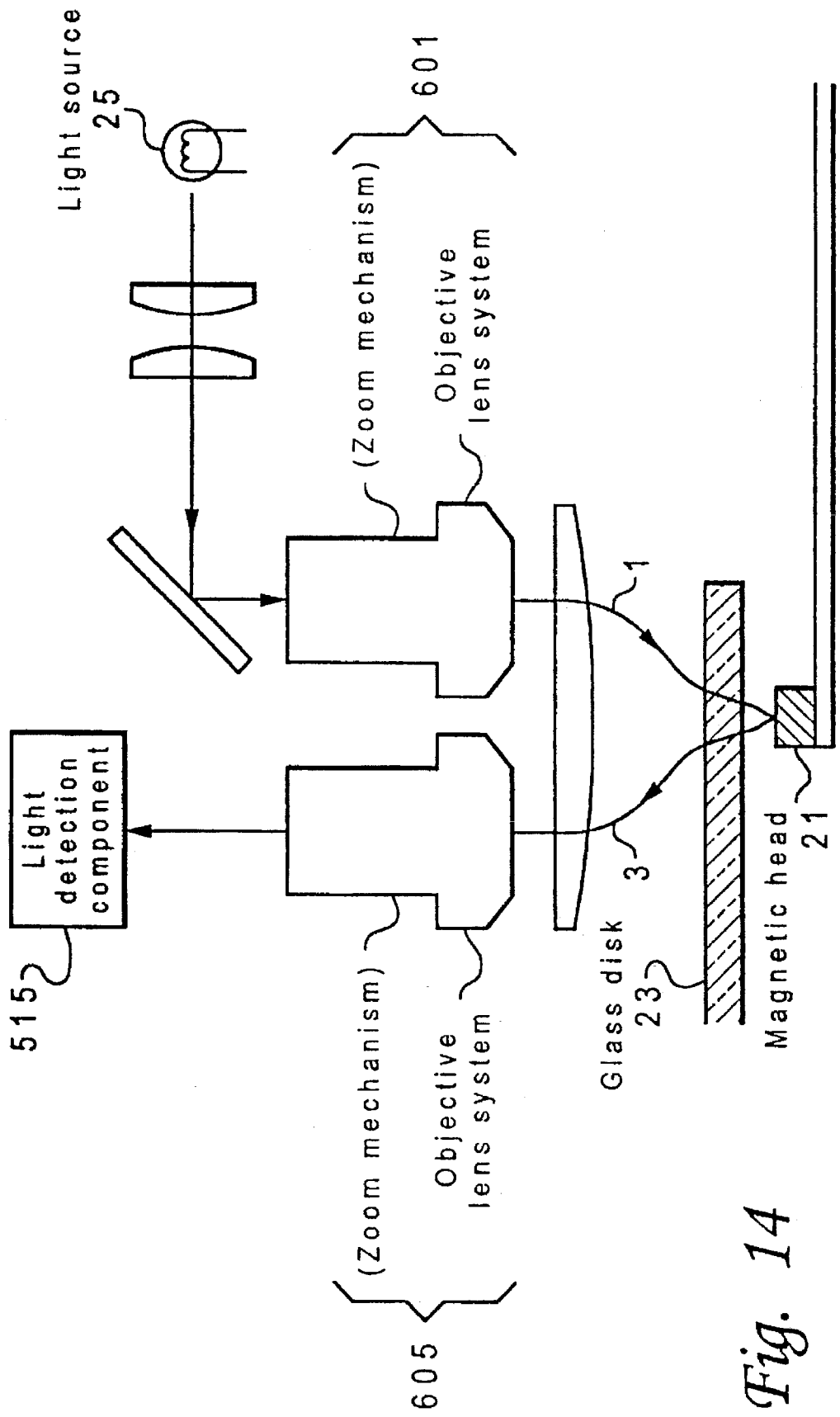
FIG. 14 is a diagram of a binocular microscope in accordance with the flare-prevention method of the present invention.

The last embodiment is an optical system in which flare is prevented by making the paths for the incident light and the detected light different. This optical system is based on the assumption that a stereomicroscope is used, as shown in FIG. 14. Since flare is produced when the reflected light of the illuminating light from the objective lens system and the multiple interference light trace the same path and the two are mixed, flare can be prevented by providing different paths for the two. As shown in FIG. 14, illuminating light 1 is introduced into the glass disk 23 and the magnetic head 21 from the first objective lens 601, and multiple interference light 3 is introduced to the light detection means through the second objective lens 605. By setting such optical paths, an accurate measurement can be performed without preventing flare by means of the polarizer, quarter-lambda plate, and analyzer. Incidentally, needless to say, attention should be paid to prevent the illuminating light from mixing into the detected light.

In summary, in accordance with the optical system and method of the present invention, the effect of change in the polarization state involved in the development of birefringence due to the photoelastic phenomenon of the glass disk can be made as little as possible while preventing flare and maintaining the position of the beam splitter between the objective lens system and the analyzer as in the prior art. In addition, by using such an optical system, the measurement error due to the photoelastic phenomenon can be made minimized even if the glass disk is rotated at a speed higher than the prior art, whereby a high measurement accuracy can be maintained.

While the invention has been particularly shown and described with reference to a preferred embodiment, it will be understood by those skilled in the art that various changes in form and detail may be made therein without departing from the spirit and scope of the invention.

What is claimed is:

1. A flare-prevention optical system comprising:

a light source;

a polarizer, wherein said polarizer converts light generated by said light source to a linearly polarized light of a first direction;

an optical lens through which said linearly polarized light of said first direction passes;

at least one reflective component that reflect said linearly polarized light of said first direction after said linearly polarized light of said first direction passes through said optical lens;

an analyzer through which light reflected by said at least one reflective component passes, said analyzer having a transmission axis orthogonal to said first direction; and a multilambda plate provided between said optical lens and said at least one reflective component, wherein both light incident upon said at least one reflective component and light reflected from said at least one reflective component pass through said multilambda plate, and wherein said multilambda plate generates a phase difference between an ordinary ray and an extraordinary ray of at least $2\pi$.

2. A flare-prevention optical system of claim 1, wherein said at least one reflective component comprises an opaque first reflective component and a second reflective component located between said first reflective component and said multilambda plate, wherein said second reflective component reflects a portion of the light at a surface thereof and transmits an unreflected portion of said light to said first reflective component.

3. The flare-prevention optical system of claim 2, wherein said first reflective component comprises a magnetic head and said second reflective component comprises a transparent disk.

4. The flare-prevention optical system of claim 3, wherein said flare-prevention optical system comprises a flying height tester for a magnetic head and said flare-prevention optical system further comprises:

a light detector that detects light passing through said analyzer, wherein intensity of light passing through said analyzer is indicative of a flying height of said magnetic head above said transparent disk.

* * * * *

UNITED STATES PATENT AND TRADEMARK OFFICE
CERTIFICATE OF CORRECTION

PATENT NO. : 5,638,207
DATED : June 10, 1997
INVENTOR(S) : Fukuzawa et al.

It is certified that error appears in the above-indentified patent and that said Letters Patent is hereby corrected as shown below:

Column 4, line 54: insert --a second time-- after "plate"

Column 8, line 42: delete "the case that"

Column 8, line 43: delete "almost" and "the case that almost"

Column 10, line 44: insert --total-- before "intensity" and delete "totally"

Column 10, line 60: delete "of"

Signed and Sealed this

Twenty-first Day of October 1997

Attest:

BRUCE LEHMAN

Attesting Officer

Commissioner of Patents and Trademarks